No. 808,078. PATENTED DEC. 26, 1905.
W. G. FELKNER & J. T. BUTLER.
COTTON CHOPPER.
APPLICATION FILED JUNE 3, 1905.
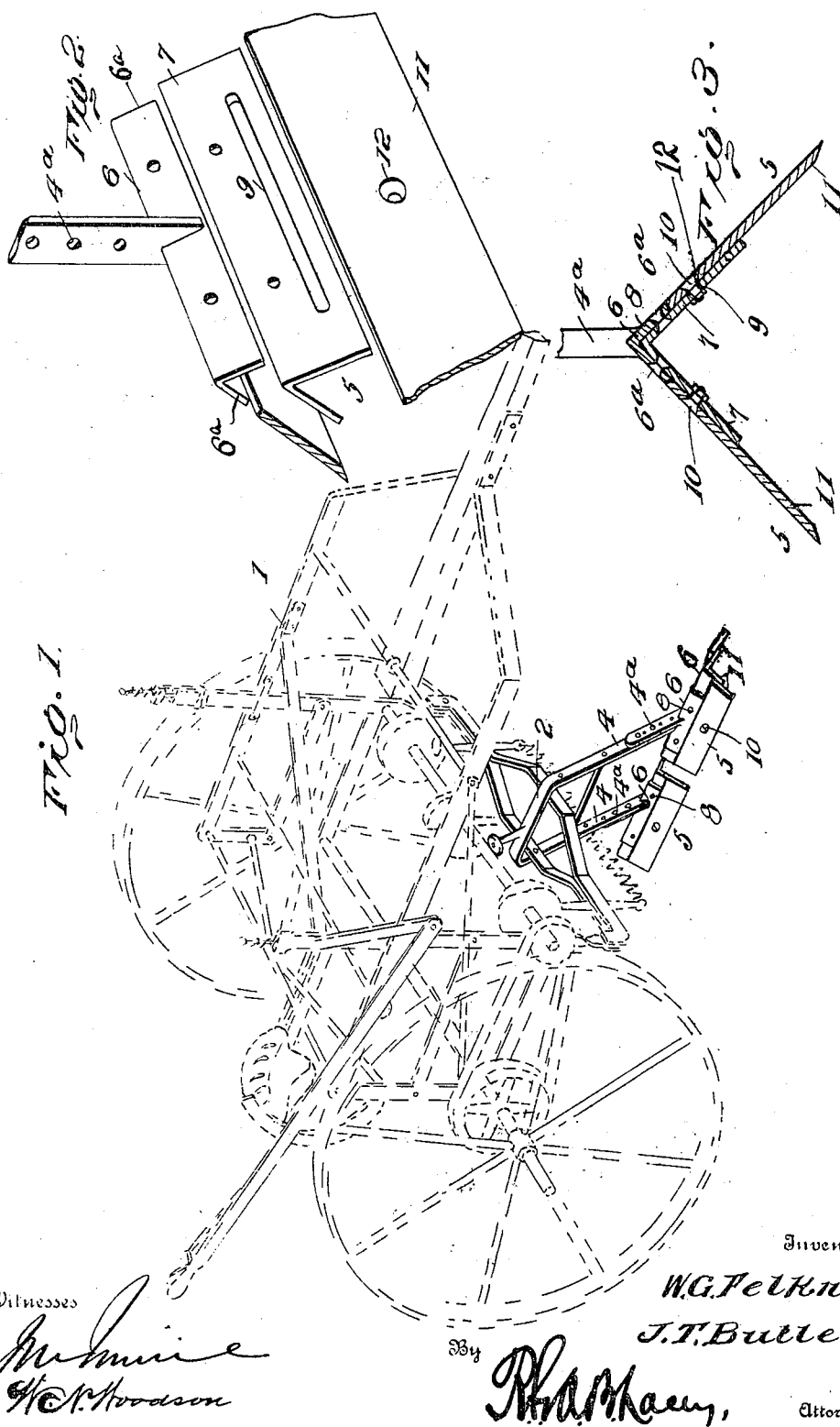

UNITED STATES PATENT OFFICE.

WILLIAM G. FELKNER AND JAMES T. BUTLER, OF SEBREE, TEXAS.

COTTON-CHOPPER.

No. 808,078.        Specification of Letters Patent.        Patented Dec. 26, 1905.

Application filed June 3, 1905. Serial No. 263,674.

*To all whom it may concern:*

Be it known that we, WILLIAM G. FELKNER and JAMES T. BUTLER, citizens of the United States, residing at Sebree, in the county of Jack and State of Texas, have invented certain new and useful Improvements in Cotton-Choppers, of which the following is a specification.

This invention relates particularly to improvements in the chopping mechanism of cotton-choppers of that type embodying a moving hoe-frame; and the essential feature of the invention is to secure a special construction and arrangement of chopping-blades which are adapted to be adjusted in such a way as to leave a greater or less number of the plants in a row as the chopper is operated, according as desired by the user and dependent upon the actual working conditions.

Specifically speaking, the invention is comprised in the special mounting of the blades, and the construction thereof is very simple and admits of convenient and quick adjustment to such an extent as to give rise to much practical advantage in agricultural implements of the type to which the invention appertains.

For a full description of the invention and the merits thereof and also to acquire a knowledge of the details of construction of the means for effecting the result reference is to be had to the following description and accompanying drawings, in which—

Figure 1 is a perspective view of a cotton-chopper of a conventional type having the invention applied thereto, the body of the implement being shown in dotted lines. Fig. 2 is a perspective view showing one of the supporting-standards of the hoe-frame and the adjacent parts constituting this invention in spaced relation to bring out clearly the exact construction thereof. Fig. 3 is a vertical section view through one of the cutters.

Corresponding and like parts are referred to in the following description and indicated in all the views of the drawings by the same reference characters.

The body or general structure of the implement or chopper may be of any type at present in use, including means for actuating the movable hoe-frame which carries the cutters designed to chop the plants in the row as the implement is advanced over the field.

The body or frame of the implement is indicated at 1, and the hoe-frame is designated 2, being supported by a suitable frame 3 in such a way as to permit free pivotal movement of the hoe-frame 2 as the latter is actuated by suitable means employed for the purpose. The hoe-frame 2 embodies spaced supporting standards or members 4, which may have the lower sections 4ª vertically adjustable, so as to permit of similar adjustment of the cutters, which are carried by the said lower sections 4ª in a manner which is well known. The lower extremities of the standards 4 support the cutters 5, and each cutter may be described as composed of a supporting member 6, which is integrally formed with the lower end of the adjacent standard 4 and which is of V shape in cross-section, having downwardly and outwardly sloping sides. (Shown clearly in Figs. 2 and 3.) Each supporting member 6 extends longitudinally of the machine, and one is carried by each standard 4, said members 6 being in longitudinal alinement and spaced from one another. Attached to the supporting members 6 of each standard 4 are the blade-holders 7, and these blade-holders are likewise of V form in cross-section, preferably, and are of the same construction as the supporting members 6, to which they are attached, this latter not being essential, however.

Each blade-holder 7 is preferably riveted at its sides or secured in a similar manner, as shown at 8, to the sides of the member 6, supporting the same, the sides of the blade-holders 7 having longitudinal slots 9 therein, said slots receiving fastening-bolts 10, by which the blades 11 are attached to the outer sides of the blade-holders. The upper portion of each blade-holder 7 is arranged between the sides of its supporting member 6 in such a way that the sides of the supporting member 6 at the lower edges form projecting longitudinal shoulders, (indicated at 6ª,) against which the upper longitudinal edges of the hoe-blades 7 are adapted to abut. A single fastening-bolt or like member 10 passes through an opening 12 in each blade 11 and attaches the blade to the adjacent side of the blade-holder 7, and because of the provision of the abutting shoulder 6ª, formed by the sides of the supporting member 6, a single fastening-bolt 10 is sufficient to rigidly position each blade as the shoulder 6ª coacts therewith to prevent any movement pivotally in a manner readily apparent.

The mounting of the blades 11 is such that the same may be longitudinally adjusted upon the member 6, and thus the blades of each standard 4 may be separated a greater or less distance and operated together at one end, so as to either cut the plants, leaving a greater or less number on the row, or the blades 11 when operated together may work as a single chopper, as the hoe-frame 4 is vibrated back and forth in actual operation.

Having thus described the invention, what is claimed as new is—

1. In a cotton-chopper, the combination of a hoe-frame embodying spaced supporting members, a blade-holder carried by each supporting member, and a blade having a pin-and-slot connection with each holder, the supporting members of the blade-holders forming abutting shoulders engaging the blades to properly hold the same in position.

2. In a cotton-chopper, the combination of spaced supporting-standards, a V-shaped supporting member at an extremity of each standard, a V-shaped blade-holder secured to each supporting member aforesaid between the sides of the latter, and longitudinal adjustable blades attached to the sides of the blade-holders and having the upper portions thereof abutting with the sides of the supporting members of the blade-holders.

3. In a cotton-chopper, the combination of spaced supporting-standards provided at their lower ends with integral V-shaped supporting members in longitudinal alinement, V-shaped blade-holders having the upper portions thereof received between the sides of the V-shaped supporting members and attached thereto, the sides of the blade-holders being slotted longitudinally, blades upon the outer sides of each blade-holder abutting with the adjacent side of the supporting member thereof, fastenings passing through the slots of the blade-holders and the blades adjustably connecting the latter therewith.

In testimony whereof we affix our signatures in presence of two witnesses.

WILLIAM G. FELKNER. [L. S.]
  JAMES T. BUTLER. [L. S.]

Witnesses:
  JOSEPHINE VOGT,
  FELICE ROTH.